Patented Apr. 15, 1952

2,592,870

UNITED STATES PATENT OFFICE 2,592,870

PRODUCTION OF COMPOSITIONS CONTAINING FINELY DIVIDED METALLIC SILVER

Haydn Geoffrey Dickenson, Appleton, Warrington, Kenneth Thomas Chapman, Pinner, and Peter Paul Hopf, London, England, assignors to Ward, Blenkinsop & Company Limited, London, England, a British company No Drawing. Application September 30, 1947, Serial No. 777,116. In Great Britain September 6, 1946

Section 1, Public Law 690, August 8, 1946
Patent expires September 6, 1966

11 Claims. (Cl. 252—313)

This invention relates to the production of metallic silver in finely divided form more especially in a form in which at least a substantial proportion of the particles of silver are of colloidal dimensions, and to compositions containing the same.

Finely divided metallic silver has been produced by striking an arc between silver electrodes under water. In this method however only a small proportion of the particles, probably about 5% have substantially colloidal dimensions.

Finely divided metallic silver has also been produced by directly reducing silver oxide with an aqueous solution of the sodium salt of protalbinic acid as well as by such mechanical processes as fine grinding.

It has now been found that finely divided silver which contains a very high proportion of particles having colloidal dimensions can be produced by treating silver oxide with a protein hydrolysis product having a molecular weight of at least three hundred together with an organic base stronger than ammonia. These products have properties not observed with the hitherto known products obtained from protalbinic acid.

Accordingly the present invention provides a process for the production of finely divided metallic silver which comprises treating silver oxide with a protein hydrolysis product having a molecular weight of at least three hundred in the presence of an organic base, stronger than ammonia, which is free from halogens and thiol groups.

According to a feature of the invention the organic base employed is an alkanolamine such as an ethanolamine. Ammonia may also be present.

The invention also includes the method of producing a coating of metallic silver which comprises applying to the surface to be coated a coating composition obtained by the said method and removing the organic matter by heating in a substantially non-oxidizing atmosphere.

The silver oxide employed may be prepared by any of the known methods. Thus silver nitrate or other water-soluble silver salt may be treated with an aqueous solution of caustic alkali and the reaction mixture heated to coagulate the transiently produced silver hydroxide. After settling the silver oxide may be washed by decantation until it is substantially neutral. The resulting silver oxide is desirably used in damp condition.

The protein hydrolysis product employed is a colloidal material and may, for example, be obtained by the controlled hydrolysis of casein with aqueous caustic alkali to the so-called protalbinic acid. Such material may be described as a polypeptide having a molecular weight of at least three hundred. Materials such as sulphur, if present, should be eliminated as far as possible during the hydrolysis of the protein and washing of the product. Other proteins such as gelatin and egg albumin may be used in place of casein. A suitable product may, for example be obtained by dissolving 224 parts by weight of casein in 600 parts of water, bringing the solution to about 70° C., adding 65 parts of caustic soda 100° Tw. and heating to 90° C. for 3 hours with stirring. The solution is then diluted with water and filtered. The product is treated with 10% aqueous nitric acid until no further precipitation occurs, the liquor decanted and the putty-like mass well washed with water by decantation and kneading.

In practising the invention it is preferred to treat the protein hydrolysis product with the organic base which is stronger than ammonia and free from halogens and thiol groups prior to introducing the silver oxide. Thus the protein hydrolysis product may be first treated with an aqueous solution of an alkanolamine and moist silver oxide introduced into the resulting composition. Ammonia may or may not be present. The alkanolamine employed may be any of the products obtained by treating an alkylene halohydrin such as an ethylene, propylene or butylene halohydrin with ammonia. Conveniently the alkanolamine is an ethanolamine, it having been found that diethanolamine is a desirable choice for this purpose.

The product obtained by the reduction of the silver oxide with the protein hydrolysis product in the presence of the strong organic base is at least substantially and preferably entirely free from non-volatile constituents other than silver derivatives concomitantly produced. The strong organic base used in the production thereof is, in general, a material which volatilises below 300° C. and preferably below 200° C. and may therefore be readily removed by the action of heat.

Silver films may be readily produced when the silver-containing composition is applied to the surface to be coated and the coated surface then heated. If desired thinners may be added to the composition but care should be taken to see that these are free from sulphur. The actual temperature to which the coating is to be heated will depend to some extent upon the base which is present. On account of the tendency for oxide formation this heating step is best carried out in the substantial absence of oxygen. Continuous, dull conductive films of metallic silver are obtained.

The compositions obtained in accordance with the invention are substantially homogeneous and have an unusual degree of stability.

The following examples illustrate the manner in which the invention may be carried into effect. All the parts are corresponding parts on the c. g. s. system.

*Example 1*

100 parts of silver nitrate is dissolved in 150 parts of water at 45° C. 100 parts of caustic soda 100° Tw. is diluted with 350 parts of water and warmed to 45° C. The silver nitrate solution is then added to the caustic soda solution whilst stirring and the whole heated to 75° C. to coagulate the silver oxide, which is allowed to settle and washed by decantation until the wash liquid is only slightly alkaline to phenol phthalein paper. The weight of damp silver oxide is about 125 parts.

200 parts by weight of protalbinic acid obtained by the hydrolysis of casein as described above and having the consistency of putty is taken up in 300 parts by volume of diethanolamine dissolved in an equal volume of water. To the resulting solution damp silver oxide, prepared as above, is gradually added whilst warming, care being taken as the solution tends to froth. When excess of damp silver oxide has been added, the colloidal suspension obtained is decanted from the excess of silver oxide. The resulting suspension can be evaporated to smaller bulk if desired and thinned with thinners such as ethylene glycol.

In one experiment 300 ccs. of the diethanolamine protalbinate solution was used to treat 470 gms. of damp silver oxide.

*Example 2*

150 parts by weight of protalbinic acid obtained as in Example 1 was taken up in 75 parts by volume of diethanolamine dissolved in 300 parts by volume of water to which had been added 180 parts by volume of .880 ammonia with heating to assist solution. 2400 parts by weight of damp silver oxide was added in small portions. Some additional ammonia was added and, towards the end of the addition, a further 150 parts by volume of diethanolamine was also added. The product was evaporated on the water bath and gave a composition which contained 72% of silver.

The products obtained in accordance with the present invention contain a major proportion of colloidal silver and some colloidal silver oxide held in suspension in a complex which comprises silver protalbinate. The products may be used in the silvering of plastic materials of both the thermoplastic and thermosetting types as well as for the silvering of ceramics. For these purposes the compositions obtained by the above processes may be thinned to the desired consistency with thinners such as ethylene and propylene glycols and their monoalkylethers. The thinned compositions may then be applied by the usual methods such as brushing, spraying and printing. When applied to ceramics the usual fluxes such as bismuth carbonate or lead borate may be incorporated in the applied compositions. The organic matter is then removed by heating.

*Example 3*

200 parts of silver nitrate is dissolved in 150 parts of water and there is added 200 parts by weight of caustic soda solution 100° Tw. previously heated to 45° C. The reaction mixture is stirred and the mixture is heated until the precipitated oxide coagulates and settles. The aqueous liquid is decanted and the product is washed until the wash liquors are only very slightly alkaline.

100 parts by volume of a 27% aqueous solution of sodium protalbinate is precipitated by the addition of excess of 10% nitric acid (40 parts by volume). A sticky precipitate is obtained which is kneaded and washed free from soluble inorganic salts. 40 parts of the resulting mass is then warmed with an aqueous solution of monoethanolamine until solution is complete. The solution of monoethanolamine is made up from 15 parts by volume of monoethanolamine and 100 parts by volume of water. To the resulting solution of protalbinate in aqueous monoethanolamine there is added 50 parts by volume of .880 ammonia.

The moist silver oxide is then stirred into this solution and formed into a pasty mass which is ultimately evaporated to the desired consistency.

The composition when applied to mica by a silk screen process followed by heating in an oxygen-free atmosphere at 250–300° C. gave a continuous conducting film of metallic silver suitable for use as an internal aerial in a radio or television receiver.

A great advantage of the products of the present invention is that the organic matter can be removed at low temperature. It has been found possible to remove it by infra-red heating or by heating at temperatures as low as 110° C. if the film is applied very thinly. It is this property which renders the products useful in the silvering of plastic materials. When heating at low temperatures it is desirable to work in the substantial absence of oxygen to avoid formation of silver oxide. At higher temperatures the oxide, if formed, is reconverted to the metal. In preparing preparations for use in the silvering of plastic materials it is preferred to employ alkanolamines, such as the ethanolamines, which only contain a small number of carbon atoms in the molecule since these are most readily volatilized.

The compositions may also be applied to insulating materials such as mica and polythene.

We claim:

1. A process for the production of a stable composition containing finely-divided metallic silver having a major proportion of the particles of substantially colloidal dimensions and substantially free from inorganic non-volatile matter which comprises treating silver oxide with a precipitated protein hydrolysis product, substantially free from non-volatile inorganic matter and having a molecular weight of at least three hundred, in the presence of an organic base stronger than ammonia which is volatilisable below 300° C. and is free from halogens and thiol groups.

2. A process for the production of a stable composition containing finely-divided metallic silver having a major proportion of the particles of substantially colloidal dimensions and substantially free from inorganic non-volatile matter which comprises treating silver oxide with protalbinic acid in the presence of a lower alkanolamine which is volatilisable below 300° C.

3. A process for the production of a stable composition containing finely-divided metallic silver having a major proportion of the particles of substantially colloidal dimensions and substantially free from inorganic non-volatile matter which comprises treating silver oxide with protalbinic acid in the presence of an ethanolamine.

4. A process for the production of a stable composition containing finely-divided metallic silver having a major proportion of the particles of substantially colloidal dimensions and substantially free from inorganic non-volatile matter which comprises treating silver oxide with the solution obtained by the reaction between a precipitated protein hydrolysis product, substantially free from inorganic non-volatile matter and having a molecular weight of at least three hundred, and an organic base stronger than ammonia, volatilisable below 300° C. and free from halogens and thiol groups, in aqueous solution.

5. A process for the production of a stable composition containing finely-divided metallic silver having a major proportion of the particles of substantially colloidal dimensions and substantially free from inorganic non-volatile matter which comprises treating silver oxide with the solution obtained by the reaction between a precipitated protein hydrolysis product substantially free from inorganic non-volatile matter and having a molecular weight of at least three hundred and an ethanolamine, in aqueous solution.

6. The process according to claim 5 in which the ethanolamine is diethanolamine.

7. A new composition of matter consisting of finely divided metallic silver having a major proportion of the particles of substantially colloidal dimensions, a reducing protein hydrolysate and an organic basic reducing agent which is volatilisable below 300° C. and free from halogens and thiol groups, said finely divided silver being free from other metallic derivatives.

8. A new composition of matter consisting of finely divided metallic silver having a major proportion of the particles of substantially colloidal dimensions, protalbinic acid and an organic basic reducing agent which is volatilisable below 300° C. and free from halogens and thiol groups, said finely divided silver being free from other metallic derivatives.

9. A new composition of matter consisting of finely divided metallic silver having a major proportion of the particles of substantially colloidal dimensions, a reducing protein hydrolysate and an alkanolamine volatilizable below 300° C., said finely divided silver being free from other metallic derivatives.

10. A new composition of matter consisting of finely divided metallic silver having a major proportion of the particles of substantially colloidal dimensions, protalbinic acid and an alkanolamine volatilizable below 300° C., said finely divided silver being free from other metallic derivatives.

11. A new composition of matter consisting of finely divided metallic silver having a major proportion of the particles of substantially colloidal dimensions, protalbinic acid and an ethanolamine, said finely divided silver being free from other metallic derivatives.

HAYDN GEOFFREY DICKENSON.
KENNETH THOMAS CHAPMAN.
PETER PAUL HOPF.

REFERENCES CITED

The following references are of record in the file of this patent:

UNITED STATES PATENTS

| Number | Name | Date |
|---|---|---|
| 1,119,647 | Schwerin | Dec. 1, 1914 |
| 1,658,289 | Heidlberg | Feb. 7, 1928 |
| 1,923,406 | Wiegand | Aug. 22, 1933 |
| 1,954,353 | Ernst | Apr. 10, 1934 |
| 2,400,304 | Hamel | May 14, 1946 |

FOREIGN PATENTS

| Number | Country | Date |
|---|---|---|
| 206,954 | Great Britain | Nov. 22, 1923 |
| 558,714 | Great Britain | Jan. 18, 1944 |
| 566,718 | Great Britain | Jan. 10, 1945 |

OTHER REFERENCES

Paal, Ber. Deut. Chem., vol. 35, 11 pp. 2195–2206 (1902).

Kennedy et al., J. A. C. S., vol. 39, pp. 2734–6 (1917).